(12) United States Patent
Lykken (10) Patent No.: US 11,425,898 B2
(45) Date of Patent: Aug. 30, 2022

(54) BAIT STATION SYSTEM

(71) Applicant: Kim Lykken, St. Cloud, MN (US)

(72) Inventor: Kim Lykken, St. Cloud, MN (US)

( * ) Notice: Subject to any disclaimer, the term of this patent is extended or adjusted under 35 U.S.C. 154(b) by 451 days.

(21) Appl. No.: 16/383,526

(22) Filed: Apr. 12, 2019

(65) Prior Publication Data

US 2019/0313628 A1    Oct. 17, 2019

Related U.S. Application Data (60) Provisional application No. 62/656,526, filed on Apr. 12, 2018.

(51) Int. Cl.
| | |
|---|---|
| *A01M 25/00* | (2006.01) |
| *B65D 55/02* | (2006.01) |
| *B65D 43/16* | (2006.01) |
| *A01M 1/20* | (2006.01) |

(52) U.S. Cl.
CPC ......... *A01M 25/004* (2013.01); *A01M 1/2011* (2013.01); *A01M 2200/011* (2013.01); *B65D 43/16* (2013.01); *B65D 55/02* (2013.01)

(58) Field of Classification Search
CPC ... A01M 25/004; A01M 25/002; A01M 25/00
USPC .......................................................... 43/131
See application file for complete search history.

(56) References Cited

U.S. PATENT DOCUMENTS

| | | | | | |
|---|---|---|---|---|---|
| 1,633,982 A | * | 6/1927 | Davis | .................. | A01M 25/004 43/131 |
| 2,953,868 A | * | 9/1960 | Chambers | ............... | A01M 1/20 43/131 |
| 3,488,879 A | * | 1/1970 | Laughlin | ............. | A01M 25/004 43/131 |
| 3,772,820 A | * | 11/1973 | Bond | .................. | A01M 25/008 43/131 |
| 4,208,829 A | * | 6/1980 | Manning | ............. | A01M 25/004 43/131 |
| 4,550,525 A | * | 11/1985 | Baker | ................. | A01M 25/004 43/131 |
| 4,630,392 A | * | 12/1986 | Ferraro | ............... | A01M 25/004 43/131 |
| 4,782,622 A | * | 11/1988 | Roberts | ................. | A01M 25/00 43/131 |
| 5,272,832 A | * | 12/1993 | Marshall | ............. | A01M 25/004 220/326 |

(Continued)

FOREIGN PATENT DOCUMENTS

| | | | | | |
|---|---|---|---|---|---|
| CA | 2978551 A1 | * | 2/2019 | .......... | A01M 25/002 |
| CH | 219068 A | * | 1/1942 | .......... | A01M 25/002 |

(Continued)

OTHER PUBLICATIONS

The International Search Report and Written Opinion rendered by the International Searching Authority for PCT/US2019/027388, dated July 2, 2019, 8 pages.

*Primary Examiner* — Darren W Ark (74) *Attorney, Agent, or Firm* — Skaar Ulbrich Macari, P.A.

(57) ABSTRACT

A tamper-proof bait station system that is capable of being weighted down to prevent an animal from removing the bait station from a desired location being treated for rodent or pest infestation. The tamper-proof bait station also includes a locking cap or cover used to secure a cover and base together.

9 Claims, 10 Drawing Sheets

(56) References Cited

U.S. PATENT DOCUMENTS

| | | | | |
|---|---|---|---|---|
| 5,448,852 | A * | 9/1995 | Spragins | A01M 25/004 43/131 |
| 5,806,237 | A * | 9/1998 | Nelson | A01M 25/004 43/131 |
| 6,145,242 | A * | 11/2000 | Simpson | A01M 1/2011 43/131 |
| 6,266,917 | B1 * | 7/2001 | Hight | A01M 1/103 43/114 |
| 6,397,517 | B1 * | 6/2002 | Leyerle | A01M 23/24 43/131 |
| 6,470,622 | B1 * | 10/2002 | Braun | A01M 25/004 43/131 |
| 6,513,283 | B1 * | 2/2003 | Crossen | A01M 25/004 43/131 |
| 6,807,768 | B2 * | 10/2004 | Johnson | A01M 25/004 43/131 |
| 7,980,023 | B2 * | 7/2011 | Nelson | A01M 25/004 43/67 |
| 8,578,649 | B1 * | 11/2013 | Walsh | A01M 25/004 43/131 |
| 8,701,337 | B2 * | 4/2014 | Kay | A01M 25/004 43/131 |
| 8,701,594 | B2 * | 4/2014 | Vickery | A01M 25/004 119/51.01 |
| 8,800,201 | B2 * | 8/2014 | Vickery | A01M 1/2011 43/131 |
| 9,532,564 | B1 * | 1/2017 | Walsh | A01M 25/002 |
| 9,538,741 | B1 * | 1/2017 | Walsh | A01M 23/30 |
| 9,663,068 | B1 * | 5/2017 | Sykora | B60R 99/00 |
| 10,362,777 | B1 * | 7/2019 | Walsh | A01M 23/30 |
| 10,561,139 | B1 * | 2/2020 | Suteerawanit | A01M 25/004 |
| 10,595,524 | B1 * | 3/2020 | Suteerawanit | A01M 29/34 |
| 2002/0043018 | A1 * | 4/2002 | Townsend | A01M 25/004 43/131 |
| 2005/0028431 | A1 * | 2/2005 | Hoyes | A01M 25/004 43/131 |
| 2009/0056199 | A1 * | 3/2009 | Reed | B29C 66/1122 43/131 |
| 2009/0307963 | A1 * | 12/2009 | Abbas | A01M 25/004 43/131 |
| 2010/0031557 | A1 * | 2/2010 | Vickery | B65D 43/162 43/131 |
| 2011/0072709 | A1 * | 3/2011 | Patterson | A01M 31/002 43/81 |
| 2011/0226921 | A1 * | 9/2011 | Patterson | A01M 25/004 248/346.03 |
| 2018/0116202 | A1 * | 5/2018 | Burger | A01M 25/004 |
| 2018/0235204 | A1 * | 8/2018 | Blank | A01M 25/002 |
| 2019/0053482 | A1 * | 2/2019 | Holland | A01M 23/36 |
| 2019/0313628 | A1 * | 10/2019 | Lykken | A01M 1/2011 |
| 2019/0387733 | A1 * | 12/2019 | Lykken | A01M 25/004 |
| 2020/0337267 | A1 * | 10/2020 | Pyzyna | A01M 25/002 |
| 2021/0015090 | A1 * | 1/2021 | Galloway | A01M 25/002 |

FOREIGN PATENT DOCUMENTS

| | | | | |
|---|---|---|---|---|
| DE | 802772 | C * | 2/1951 | A01M 25/004 |
| DE | 29519475 | U1 * | 2/1996 | A01M 25/008 |
| EP | 0388349 | A3 * | 3/1991 | A01M 25/008 |
| EP | 0442190 | B1 | 1/1994 | |
| EP | 2719279 | A1 * | 4/2014 | A01M 1/2011 |
| EP | 3456198 | B1 * | 4/2020 | A01M 25/004 |
| FR | 3092966 | A1 * | 8/2020 | A01M 25/004 |
| KR | 100819748 | B1 * | 4/2008 | |
| KR | 20110041999 | A * | 4/2011 | |
| WO | WO-2009056817 | A2 * | 5/2009 | A01M 25/004 |
| WO | WO-2017031056 | A1 * | 2/2017 | A01M 25/004 |
| WO | WO-2020205881 | A1 * | 10/2020 | A01M 29/34 |
| WO | WO-2021011575 | A1 * | 1/2021 | A01M 25/004 |

* cited by examiner

BAIT STATION SYSTEM

REFERENCE TO RELATED APPLICATION

This application claims priority to U.S. Provisional Application No. 62/656,526, filed Apr. 12, 2018, the entire disclosure of which is hereby incorporated by reference herein.

FIELD

The present invention relates generally to bait stations, more particularly, to bait station system that can be conveniently weighted to prevent its unintended movement from a location.

BACKGROUND

It is common for rodents and other pests to infiltrate buildings or structures seeking shelter and foodstuffs. Throughout history attempts have been made to control and reduce the rodent or pest population. The most effective method has been and continues to be the use of a poison that is lethal to the pest. Unfortunately, these poisons are also attractive to other animals such as pets, livestock and desirable wildlife. In order to prevent the unintentional poisoning of other animals, the poison is typically placed into a container that restricts its access to the pests or rodents that are typically smaller in size. The rodents and pests are attracted to the poison, which is typically combined, impregnated or mixed with the food. The rodents and pests enter the container where they ingest the poison, which causes their termination.

The conventional containers used for housing the poisoned bait have numerous drawbacks. First, they are light and can be carried away by larger animals such as dogs or raccoons. If they are removed from their intended location the treatment fails to be effective. Secondly, weighted bait stations have been invented but use heavy ballasts that must be stored and carried with the bait station between jobs or pest control sites. Lastly, in order to prevent children from coming into contact with the poison many conventional containers require a key to open the container for refilling purposes. The problem with using keys is that they can become lost or useless if the key opening becomes filled with snow, dirt or debris.

In all of the devices available or described a need has remained for an improved bait station that is not easily removed by animals and one that may be easily opened without a key while preventing children from coming into contact with the poison bait.

SUMMARY

A tamper-proof bait station system that is capable of being weighted down to prevent an animal from removing the bait station from a desired location being treated for rodent or pest infestation.

It is a feature of the present invention to provide a weighted housing having an interior that may be easily filled with a substance that provides additional weight to the bait station.

It is another feature of the present invention to provide a tamper-proof assembly that does not require a key for accessing an interior of the bait station.

Further objects, features and advantages of the invention will be apparent from the following detailed description when taken in conjunction with the accompanying drawings.

The above summary is not intended to limit the scope of the invention, or describe each embodiment, aspect, implementation, feature or advantage of the invention. The detailed technology and preferred embodiments for the subject invention are described in the following paragraphs accompanying the appended drawings for people skilled in this field to well appreciate the features of the claimed invention. It is understood that the features mentioned hereinbefore and those to be commented on hereinafter may be used not only in the specified combinations, but also in other combinations or in isolation, without departing from the scope of the present invention.

While the invention is amenable to various modifications and alternative forms, specifics thereof have been shown by way of example in the drawings and will be described in detail. It should be understood, however, that the intention is not to limit the invention to the particular example embodiments described. On the contrary, the invention is to cover all modifications, equivalents, and alternatives falling within the scope of the invention as defined by the appended claims.

DETAILED DESCRIPTION

In the following descriptions, the present invention will be explained with reference to various exemplary embodiments. Nevertheless, these embodiments are not intended to limit the present invention to any specific example, environment, application, or particular implementation described herein. Therefore, descriptions of these example embodiments are only provided for purpose of illustration rather than to limit the present invention.

Dimensions and relative proportions of components are merely example embodiments and can be varied unless specifically limited in a given claim. Thus, the dimensions can be varied without departing from the scope of the invention.

As illustrated in FIGS. 1-13, the present invention of a bait station system 10 includes a cover 12 having a top 13 with downwardly extending side walls 14. As particularly illustrated in FIGS. 3 and 8, a bottom surface 15 of the top 13 may have one or more upper divider walls 16 extending downwardly therefrom that are used to divide a portion of the interior of the bait station 10. In one example embodiment, the side walls 14 may terminate in a groove 17 that is releasably mateable with a portion of a base 20 of the bait station 10. In another example embodiment of the invention, the cover 12 may be hingedly coupled to a portion of the base 20. Any hinge mechanism may be used including living hinges or knuckle and pin hinges. The hinge may be added to or molded into the cover 12 and base 20 during the manufacturing process.

Figure 2:
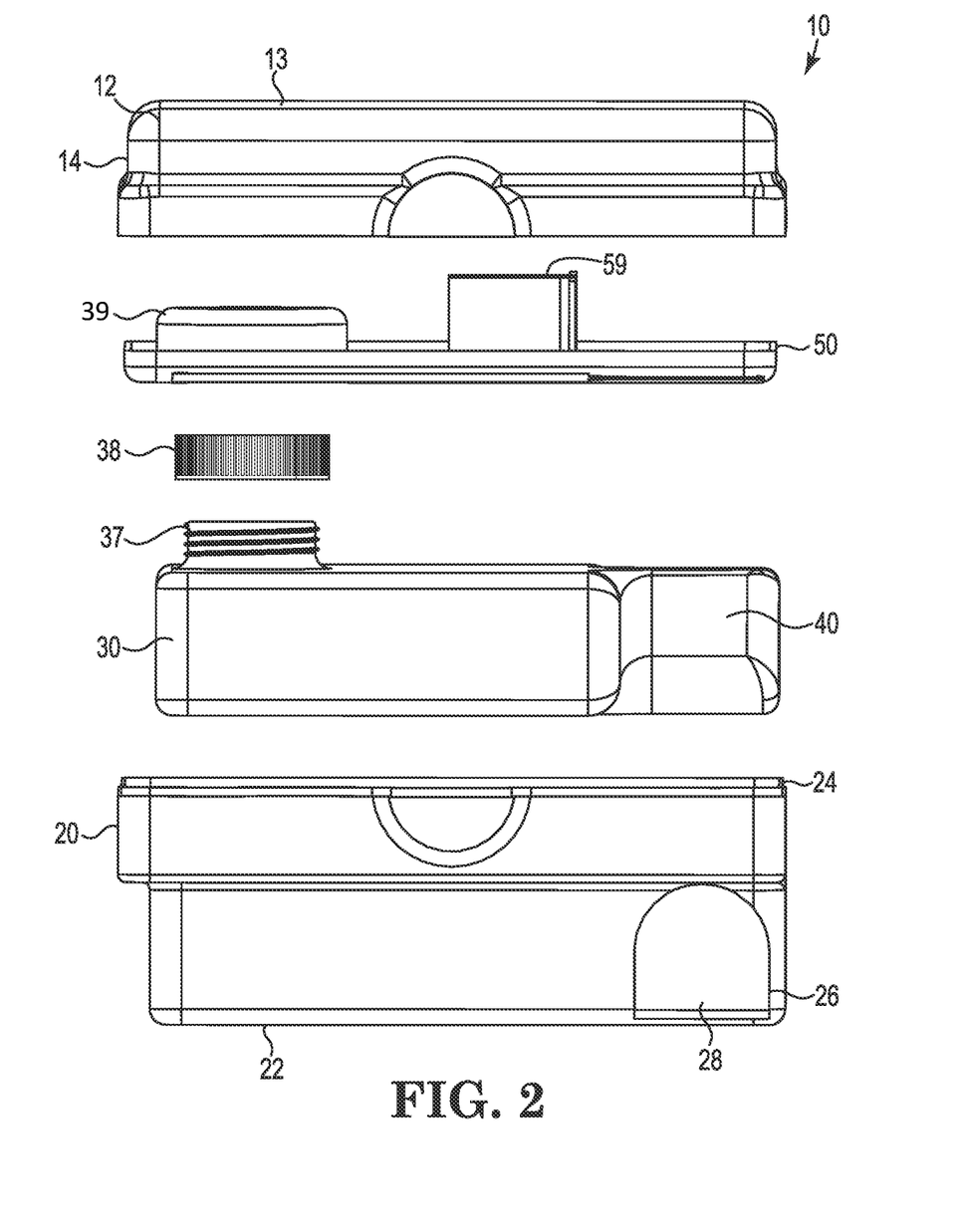
FIG. 2 is an exploded view of the bait station system according to an example embodiment of the invention.
Figure 3:
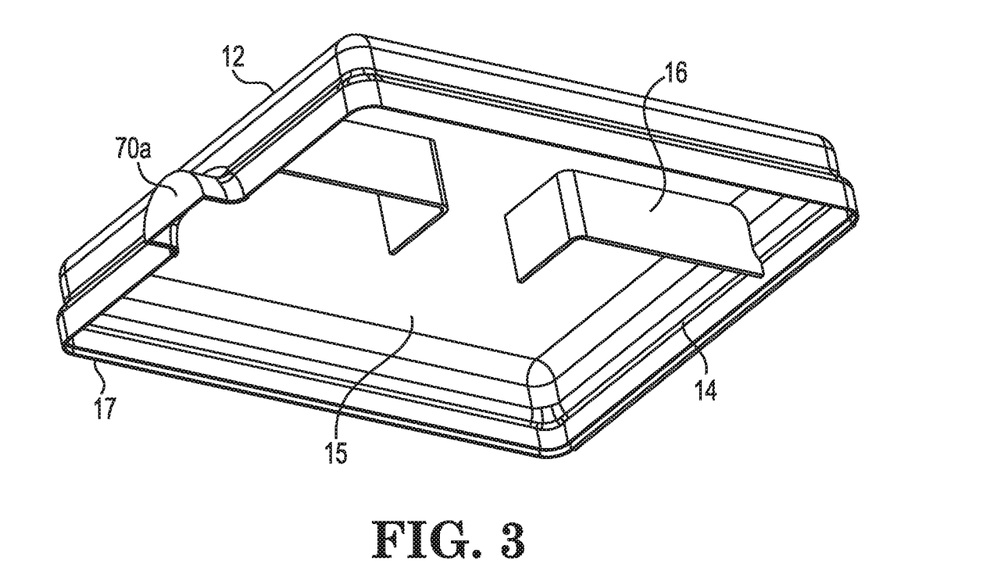
FIG. 3 is a bottom perspective view of a cover of the bait station according to an example embodiment.
Figure 4:
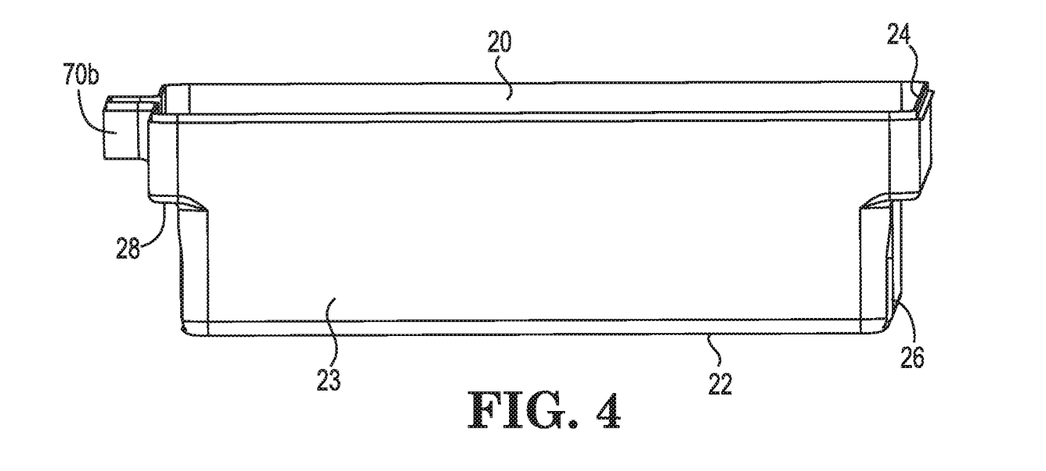
FIG. 4 is a perspective view of a base of the bait station according to an example embodiment.
Figure 8:
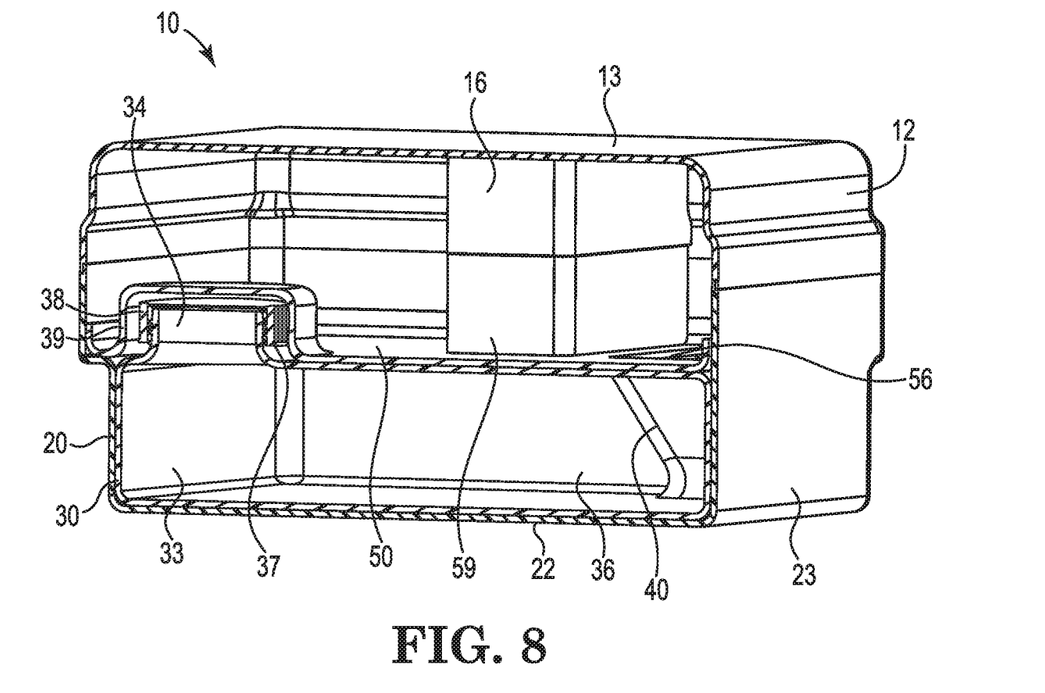
FIG. 8 is a cross sectional view of the assembled base station system according to an example embodiment of the invention.

As particularly illustrated in FIGS. 2, 4 and 8, the base 20 of the bait station 10 includes a bottom 22 with upwardly extending side walls 23. The side walls 23 of the base 20 may have a lip or edge 24 that is removably positionable in the groove 17 of the cover 12. Other mating features are also possible. For example, a gasket may be positioned in the groove 17 of the cover and abuttable against the lip 24 of the base 20. The gasket may be used to provide a seal against intrusion of moisture other environmental conditions into the interior of the bait station system 10.

In another example embodiment of the invention, the side walls 14 and 23 of the cover 12 and base 20, respectively, may abut each other with a skirt portion of the cover 12 extending generally downward beyond where the cover 12 and base 20 abut. The skirt portion of the cover 12 acts to prevent the intrusion of moisture and other environmental conditions into the interior of the bait station system 10.

One or more of the side walls 23 of the base 20 can have one or more openings 26 extending therethrough to permit rodents and pests access to an interior 28 of the bait station 10. The openings 26 may be positioned anywhere in the side walls 23. The openings 26 may also have any shape or size to accommodate rodents or pests of varying sizes.

As illustrated in FIGS. 2, 5A, 5B, and 8, the bait station system 10 may include receptacle 30 having an outer wall or casing that defines an interior 36 thereof. The receptacle 30 may be removably positioned in the interior 28 of the base 20. The receptacle 30 may be used to receive a fill material in order to add additional weight to the bait station 10. The outer wall of the receptacle 30 generally includes a top 31 and bottom 32 spanned by a peripheral wall 33. The receptacle 30 may include an access opening 34 that provides access to the interior 36 of the receptacle 30. The receptacle 30 may be filled with any weighting material, such as water, sand, gravel, dirt, cement and the like that is capable of adding weight to the bait station 10. In one example, the receptacle 30 is configured to hold a volume of one gallon of a fluid such as water or an equivalent volume of a solid matter. However, the receptacle 30 can have a larger or smaller volume and the foregoing should not be considered limiting.

In one example embodiment of the invention, the material used to fill the receptacle 30 may be changed depending upon the season or conditions as a means of attracting rodents or pests. For example, in warmer conditions the material may be any material that is able to maintain or emit a temperature cooler than the surroundings. This creates a cooler internal temperature in the bait station 10 that will be attractive to rodents or pests. Likewise, in cooler conditions, the material may be any material that is able to maintain or emit warmer temperatures than the surroundings. This material will increase a temperature in the bait station thus attracting rodents or pests. As briefly described above, the materials may include but are not limited to water, sand, cement, silicon, sulfate, calcium or other materials that may be selectable based upon their thermal properties.

Heating or cooling the interior 28 of the bait station 10 may also be accomplished by any means that is able to generate a warm or cool interior environment. For example, a power source such as a battery or a solar panel may be used to provide power to a thermoelectric device that operates under the Peltier Effect. Other means of heating and cooler are also possible and should be considered to be within the spirit and scope of the invention.

Figure 5A:
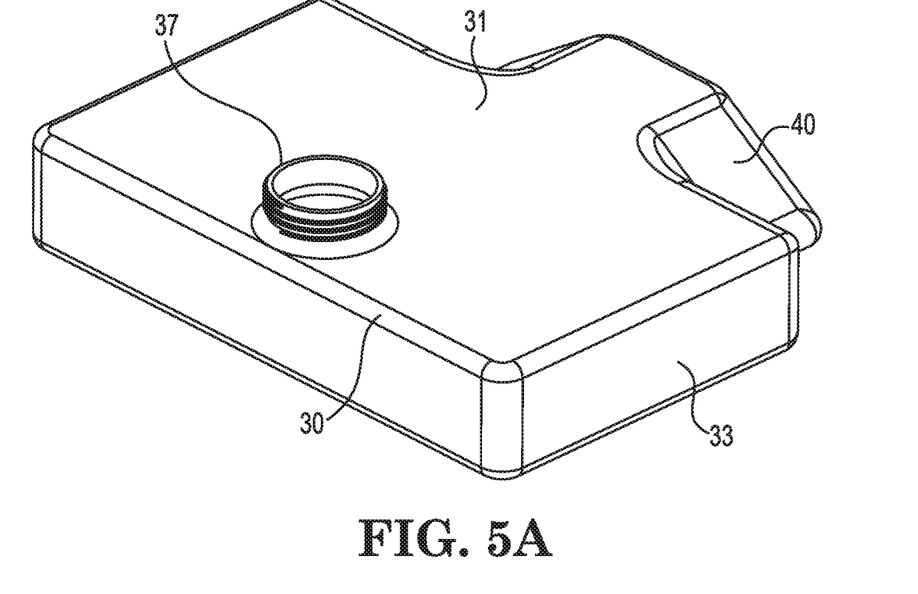
FIGS. 5A and 5B are perspective views of a receptacle of the bait station according to an example embodiment.
Figure 5B:
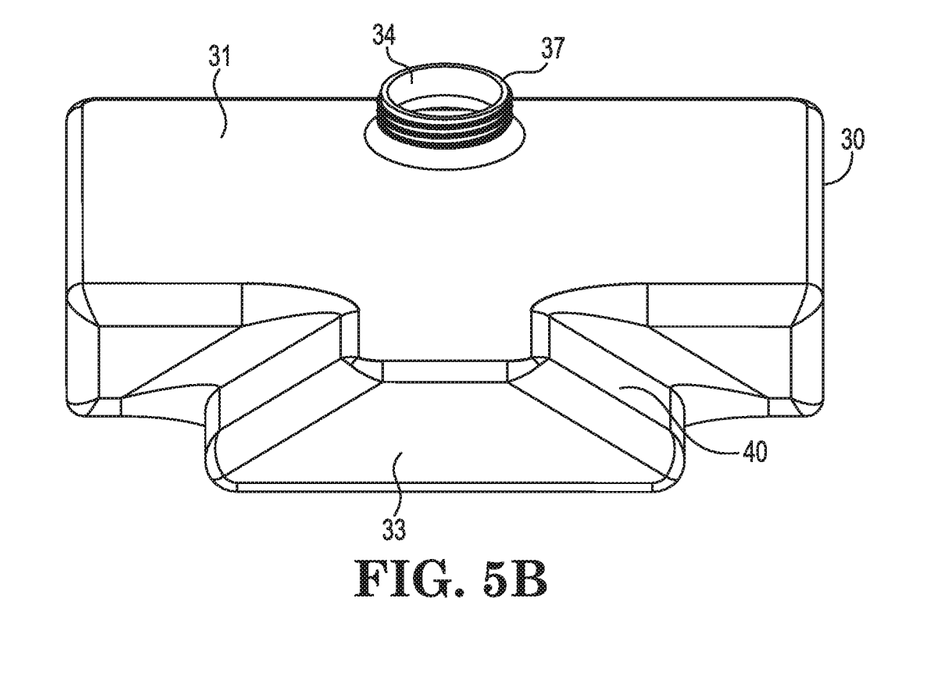

In an example embodiment of the invention, as particularly illustrated in FIGS. 5A and 5B, a threaded neck 37 may extend from the top 31 of the receptacle 30 about the opening 34. A cap 38 may be removably coupled or threaded to the threaded neck 37 to selectively close the opening 34. The inner recess of the cap 38 can be provided with grooves that correspond to the threads of the neck 37. In one embodiment, the threads of the cap 38 and neck 37 can be configured to create a "child-proof" closure where the user must apply downward force and then turn the cap counter-clockwise while maintaining the downward force in order to release the cap 38.

Other interior 36 closure mechanisms are also possible. For instance, a plug or similar plugging or blocking device may be used to block the access opening 34. A latch or hatch may also be used to close the interior 36 of the receptacle 30.

In an example embodiment of the invention, the receptacle 30 may include a volume measurement marking or portion used to determine an ideal maximum volume of a liquid in the receptacle 30. The volume measurement marking or portion may comprise a tab extending inwardly into the interior of the receptacle 30. The tab may include a marking such as a line or similar indicia. The volume measurement marking or portion can be positioned proximate to the access opening 34 such that it is visible to a user looking into the interior of the receptacle 30. When a liquid is placed into the receptacle up to the volume measurement marking or portion it creates a gap between a top of the liquid and top 31 or cap 38 of the receptacle 30. The gap creates a space for receiving the liquid as it expands, such as during freezing temperatures.

As illustrated in the FIG. 8, the receptacle 30 may be removably positionable in the base 20. As particularly illustrated in FIGS. 5A, 5B and 8, receptacle 30 may include a ramp or inclined portion 40 that is positionable proximate the opening 26 of the base 20. The ramp or inclined portion 40 may be formed in the peripheral wall 33 of the receptacle 30. Multiple ramp or inclined portions 40 may be formed in the receptacle 30 and positioned adjacent to openings 26 in the base 20. In one example embodiment, poison may be placed on the top 31 of the receptacle such that rodents may climb the inclined portion 40 to access and consume the poison.

It should be appreciated that the receptacle feature is advantageous because it reduces or eliminates the need of the user to transport a heavy object that would be used to weigh down a conventional pest trap. Instead of a concrete or metal bloc, the use can simply fill the receptacle with water, sand grave, dirt, etc. Thus, the bait station 10 need not be secured to a separate anchor, so that is a cost and time savings. The fill material in the enclosure can also be easily removed by removing the cap and dumping the contents. This makes transporting previously-deployed traps easy and convenient.

Figure 6:
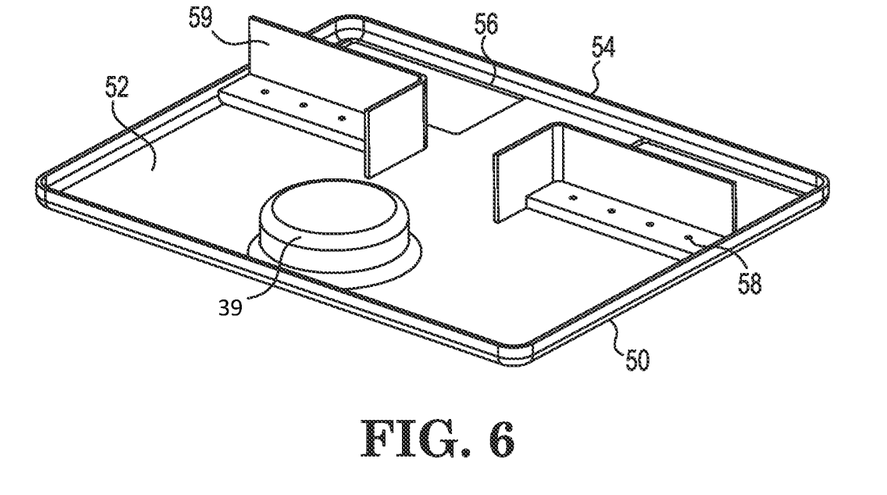
FIG. 6 is a perspective view of a tray of the bait station according to an example embodiment.
Figure 7:
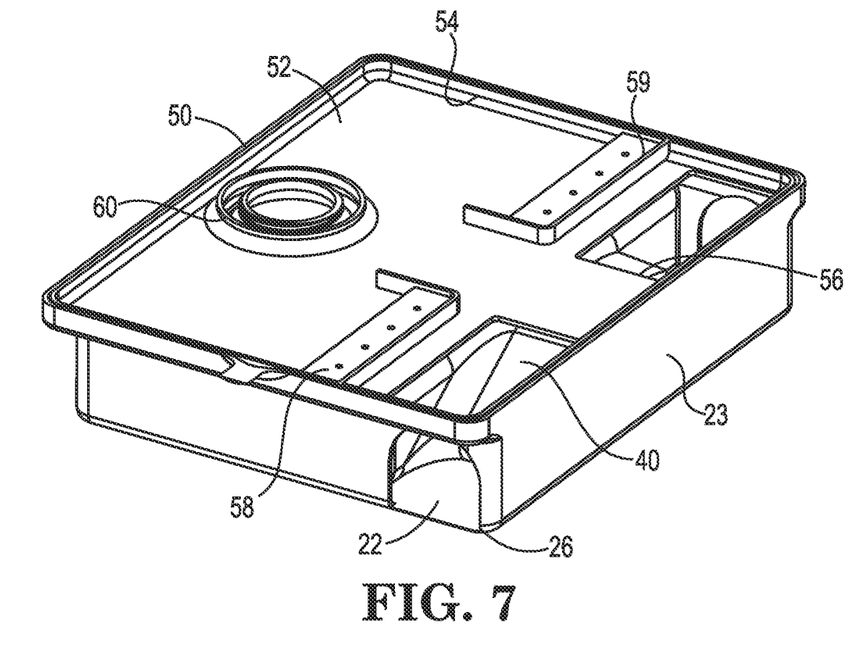
FIG. 7 is a perspective view of the receptacle positioned between the tray and base of the bait station according to an example embodiment.

In another example embodiment of the present invention, as particularly illustrated in FIG. 7, a tray 50 can be removably positioned or fixed on the receptacle 30 in the bait station 10. The tray 50 can hold, support, or retain the poison for the rodents and can also form a rodent path within the bait station 10. As illustrated in FIGS. 6 and 7, the tray 50 has a support surface 52 for supporting or holding the poison and rodents entering the bait station 10. In one embodiment, the tray 50 may also include a perimeter wall or lip 54 extending upwardly to maintain the poison on the support surface 52. The support surface 52 generally has one or more openings 56 positioned or positionable near a top of inclined portions or ramps 40. Rodents climbing the ramps 40 pass through the openings 56 to access and consume the poison.

The support surface 52 may also include one or more holes 58 extending therethrough that are capable of receiving pins 90 or other securing devices that are used to secure the poison 92 to the tray 50. The pins 90 may be insertable up through the support surface 52 and the poison inserted onto the pins. The pins 90 may extend any distance from the support surface 52 of the tray 50 to the bottom surface 15 of the cover 12. The support surface 52 of the tray 50 may have one or more elevated portions on which the poison sits in order to permit a portion of the pins 90 to be seated in the support surface 52 of the tray 50 and to prevent interference between the pins and the receptacle 30.

Additionally, the tray 50 may include one or more lower divider walls 59 extending upwardly from the support surface 52 to further divide the interior formed between the cover 12 and the tray 50 seated on the base 20, to create a path for the rodents, and to make it difficult for rodents to remove the poison from the bait station 10. As particularly illustrated in FIG. 8, the lower divider walls 59 may be adjacent to or abut the upper divider walls 16 of the cover 12. In another embodiment of the invention, the lower divider walls 59 or the upper divider walls 16 may have a height such that they extend or span a distance between the support surface 52 and the cover 12, when the cover 12 is in a closed position.

As illustrated in FIG. 7, the support surface 52 of the tray 50 may have an aperture 60 extending therethrough capable of receiving the threaded neck 37 of the receptacle 30. The cap 38 may be threaded onto the threaded neck 37 such that the tray 50 is at least temporarily fixed or secured to the receptacle 30. In yet another embodiment, the aperture 60 is larger than the cap 38 permitting the cap 38 to freely pass through it.

In another example embodiment of the invention, the support surface 52 of the tray 5 may have cover portion 39, formed therein that is adapted to cover the access opening 34 or cap 38. The cover portion 39 may extend upwardly from the support surface 52 to define a recess adapted to receive the neck portion 37 and/or cap 38. The cover portion 39 protects the access opening 34 and cap 38, if provided, from coming into contact with debris and other material brought into the bait station 10 or created by the rodents while they are in the bait station 10.

Figure 1:
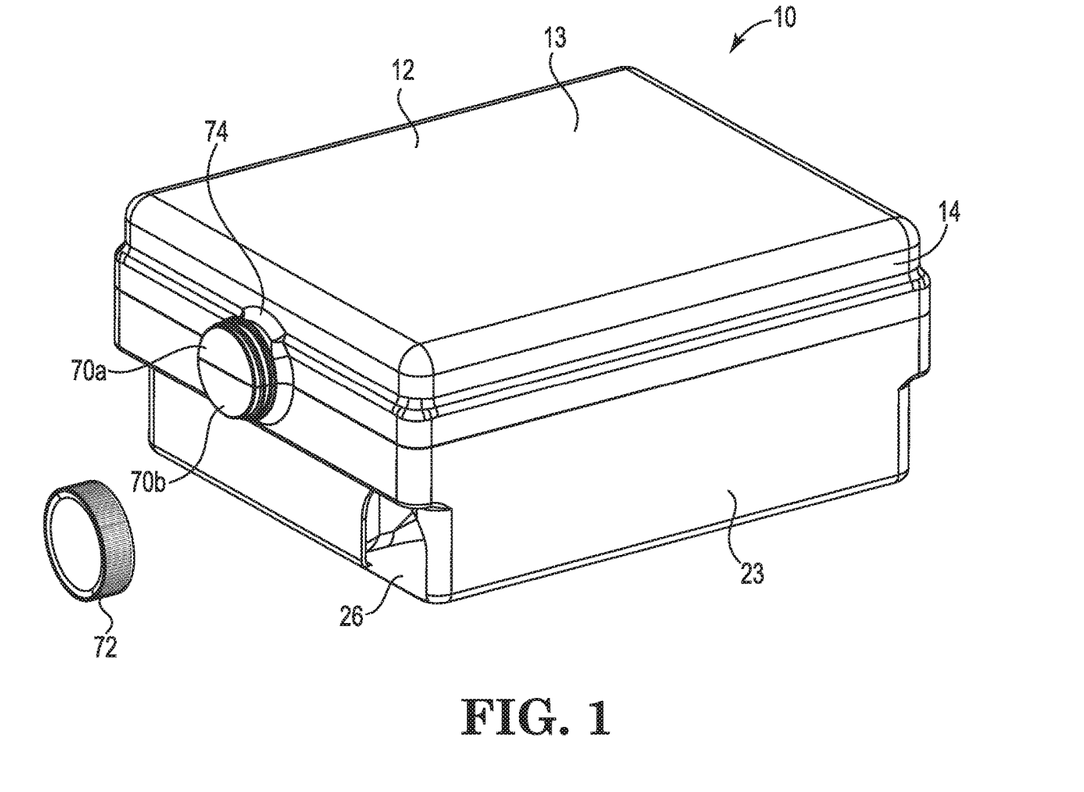
FIG. 1 is a perspective view of the bait station system according to an example embodiment.
Figure 9:
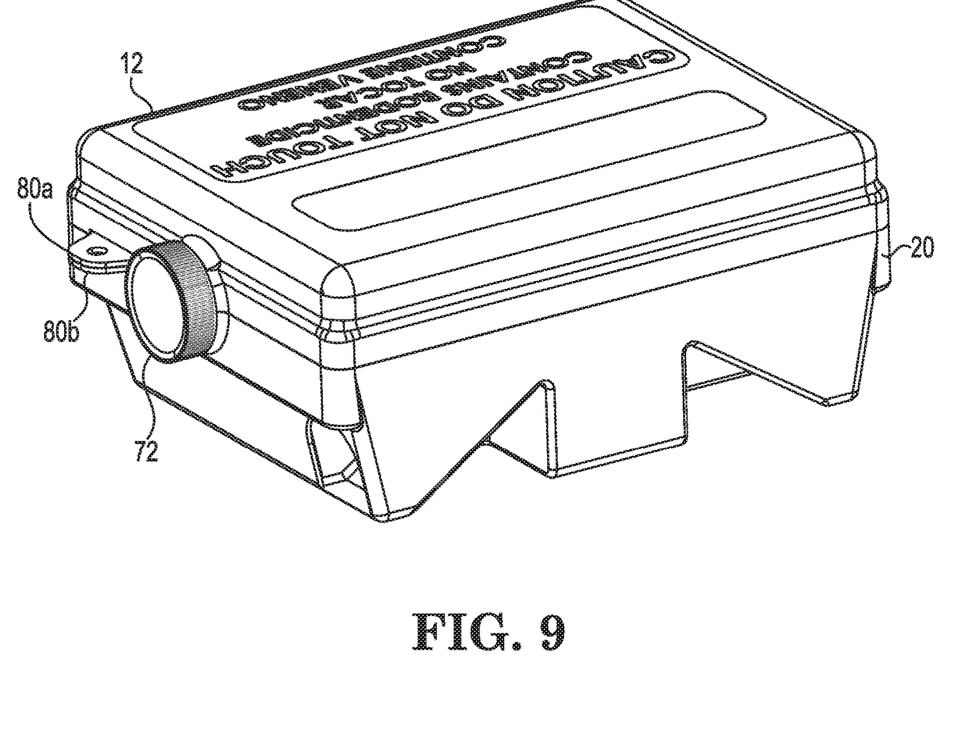
FIG. 9 is a perspective view of the assembled base station system with a cap or cover coupled thereto.
Figure 10:
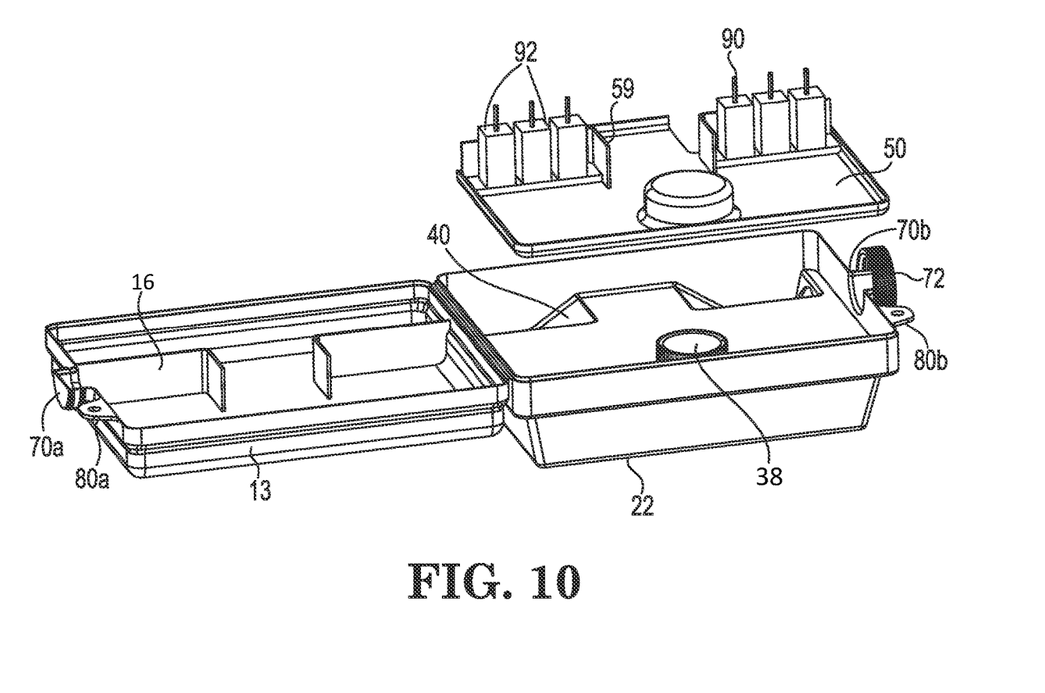
FIG. 10 is a perspective view of the assembled base station system with bait disposed on in the base station.
Figure 11:
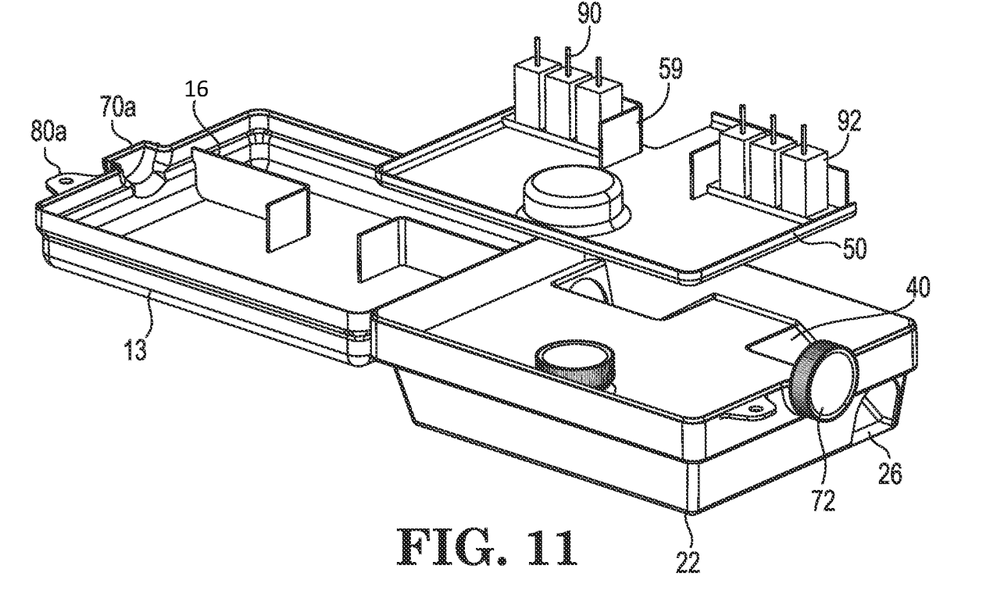
FIG. 11 is an exploded perspective view of a base station system in accordance with an example embodiment of the invention.
Figure 12:
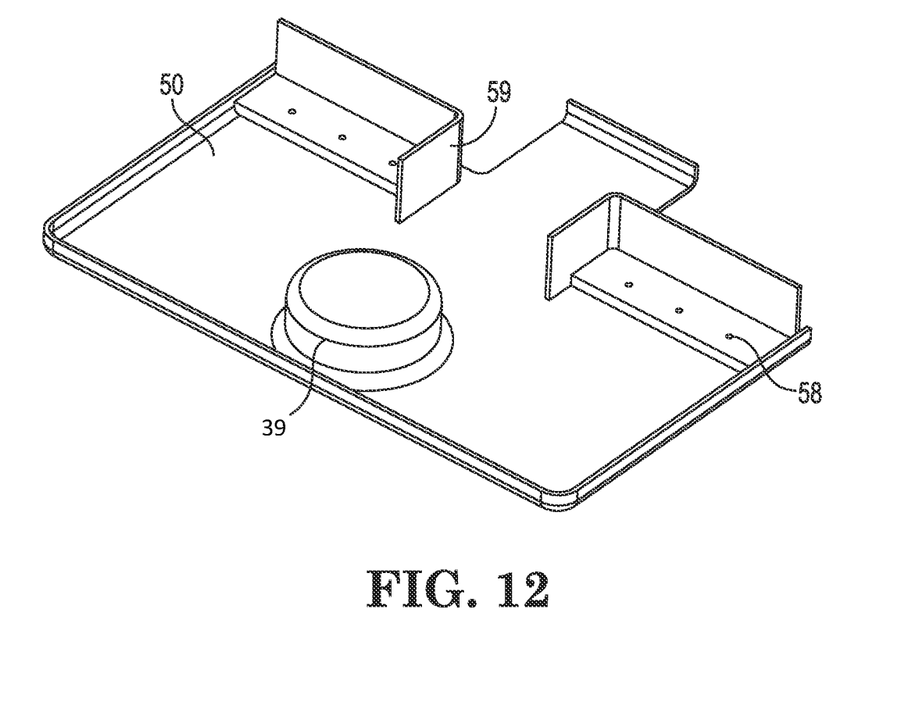
FIG. 12 is tray of a bait station system in accordance with an example embodiment of the invention.
Figure 13:
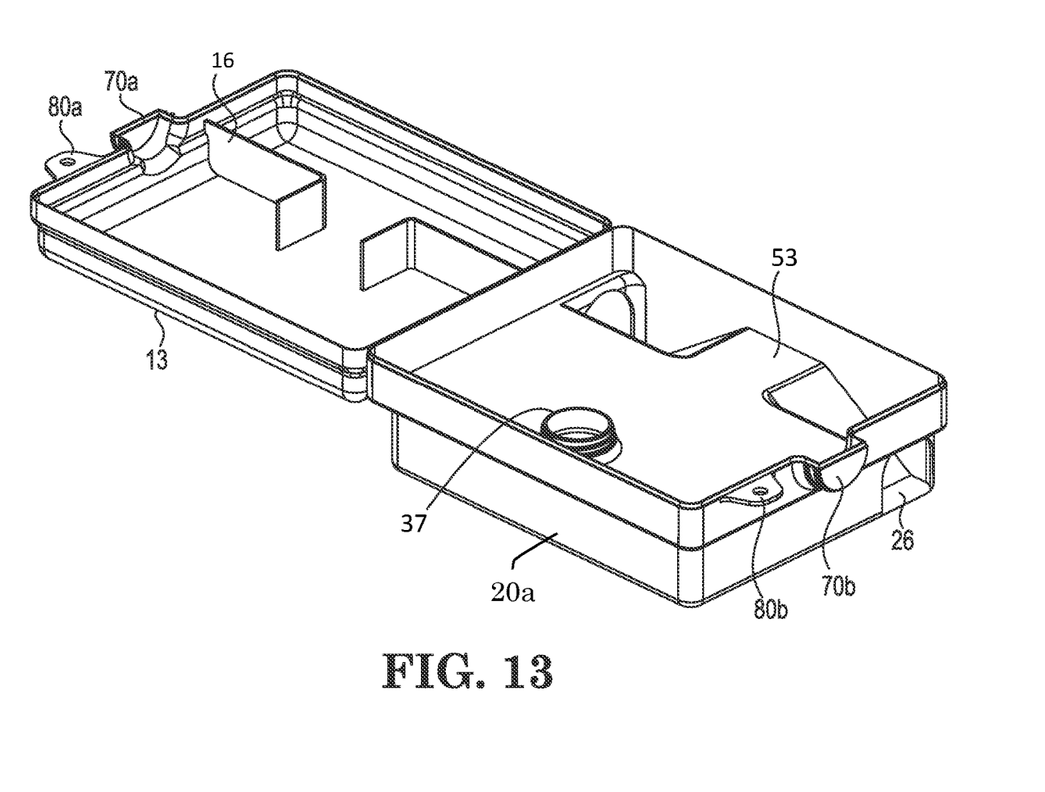
FIG. 13 is a bait station system having a hinged lid coupled to a reservoir bottom in accordance with an example embodiment of the invention.

In another embodiment of the invention, as illustrated in FIGS. 1 and 9-10, the sidewall 14 of the cover 12 and the sidewall 23 of the base 20 have outwardly extending mating or abutting latch portions 70a and 70b. The latch portions 70a and 70b may be latched together by a securing mechanism to prevent separating the cover 20 from the base 30. The latch portions 70a and 70b may have external threaded surfaces. In one embodiment, the securing mechanism may comprise a locking cap or cover 72 threaded onto the latch portions 70a and 70b to prevent their separation. Similar to medicine bottles, the cap 72 may resist unthreading absent the application of a force that is axial to a rotational movement of the locking cap. In one example embodiment, the cover 12 and/or base 20 may include a catch 74 capable of engaging ridges on an outer surface of the cap 72. The catch 74 prevents a child from removing the locking cap 72 and accessing the poison.

In an example embodiment of the present invention, the side walls of the cover 12 and the base 20 may have tab portions 80a and 80b extending outwardly therefrom that are abuttable or positionable proximate to each other when in a closed position. The tab portions 80a and 80b may have holes extending therethrough for receiving a lock or other securement device capable of preventing separation or opening of the cover 12 from the base 20.

In yet another example embodiment of the invention, as illustrated in FIGS. 10-13, the base 20 includes a top wall 53 such that the base 20 forms a tank 20a having an interior that is separate from the interior of the bait station 10. The tank 20a is able to receive a volume of material such as water or sand. The tray 50 may be removably positioned on the top wall 53 of the tank 20a. As described above, the tray 50 may include bait or poison 20 holding areas. The bait or poison 92 may be secured by pins 90 that may be secured in the openings or holes 58 formed in the top of the base 20. The bait or poison 92 can be replaced or refilled by opening the lid or cover 12 and placing the poison 92 on the pins 90. As an animal or rodent enters the ramp or incline 40 it can access the poison 92 but it restricted from removing the poison 92 by the pins 90.

The ramps 40 of the tank 20a are used for rodents or pests to access the interior of the bait station 10 without entering the interior of the tank 20. The ramps 40 may be formed in the side walls 22, or the side walls 22 and bottom 22, of the tank 20a. As previously described, an access opening 34 and cap 38 may also be used to enclose the interior of the tank 20a. Materials capable of adding weight to the tank 20a may be introduced through the access opening 34 and secured with the cap 38.

In another example embodiment of the invention, the top wall 53 of the tank is the bait or poison staging area and there is no separate tray 50. The top wall 53 of the tank 20a may include the divider walls 59 extending upwardly therefrom to define the poison holding areas and to aid in preventing a rodent from removing the poison 92 from the station 10.

In yet another example embodiment of the present invention, a width of the base 20 may generally taper from the cover 12 toward the bottom 22. The tapered base 20 enables the bait station 10 to be easily removed from snow or ice. Additionally, as snow or ice falls or expands the tapered base causes the base station 10 to be pushed upwardly and not become frozen into or to the ground or surface supporting the bait station 10.

Referring to FIG. 9, a side wall 23 and bottom 23 of the base 20 may include one or more expansion gaps that permit the expansion of snow or ice coming into contact with the base 20. The expansion gaps may include one or more grooves, channels, cut-outs and the like.

While the invention has been described in connection with what is presently considered to be the most practical and preferred embodiments, it will be apparent to those of ordinary skill in the art that the invention is not to be limited to the disclosed embodiments. It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products. Moreover, features or aspects of various example embodiments may be mixed and matched (even if such combination is not explicitly described herein) without departing from the scope of the invention.

What is claimed is:

1. A tamper-resistant bait station for holding a poison used to eliminate a pest, the bait station comprising:
   a tank having a top, bottom and a side wall defining a tank interior adapted to receive a material, the tank having at least one access opening that permits entry of the pest into an interior of the bait station, the side wall having an externally threaded first latch portion extending outwardly therefrom, wherein the tank further includes an access hole extending into the tank interior to permit the entry and exit of the material such that the material is adapted to add weight to the bait station to restrict its movement and a threaded collar extending about the access hole, the threaded collar being selectively closable;
   a cover having a top and a side wall, the cover being selectively positionable between an open and closed position with respect to the tank to permit access to the interior of the bait station, the side wall of the cover having a second externally threaded latch portion extending outwardly therefrom that is matable with the first latch portion when the cover is in the closed position; and
   a cap being threadedly matable to the first and second latch portions, the cap being adapted to resist unthreading absent application of a force axial to a rotational movement of the cap.

2. The tamper-resistant bait station of claim 1, further comprising a tank cap that is adapted to selectively cover the access hole of the tank.

3. The tamper-resistant bait station of claim 1, further comprises a poison support tray positionable on at least a portion of the tank, the poison support tray includes at least one opening orientatable proximate at least one ramp portion of the tank extending from the at least one access opening to permit rodent access to the poison positioned on the tray.

4. The tamper-resistant bait station of claim 3, further comprising at least one pin extending from the tray, wherein the poison is securable over the at least one pin to restrict its removal from the bait station.

5. The tamper-resistant bait station of claim 3, further comprising the threaded collar extending within a portion of the poison support tray when the poison support tray is positioned on at least the portion of the tank.

6. The tamper-resistant bait station of claim 5, further comprising a cap removably securable to the threaded collar to selectively cover the access hole of the tank.

7. The tamper-resistant bait station of claim 1, further comprising poison adapted to placed above the tank, wherein rodents entering the interior of the bait station are able to consume the poison.

8. A tamper-resistant bait station for holding a poison used to eliminate a pest, the bait station comprising:
   a base having a top wall, a bottom wall, and a side wall defining an enclosed base interior adapted to retain a weighted material, the side wall and top wall each having at least one access opening connected by a ramp portion that permits entry of the pest into an interior of the bait station and onto the top wall, the side wall having an outwardly extending externally threaded first latch portion;
   a cover having a top and a side wall, the cover being selectively positionable between an open and a closed position with respect to the base to permit access to the top wall of the base, the side wall of the cover having an outwardly extending externally threaded second latch portion that is matable with the first latch portion when the cover is in the closed position;
   a cap being threadedly matable to the first and second latch portions, the cap being adapted to resist unthreading absent application of a force axial to a rotational movement of the cap;
   a poison support tray including at least one opening orientatable proximate the ramp portion to permit rodent access to the poison positioned on the poison support tray;
   a material access opening extending above the top wall of the base to permit selective placement of the weighted material into the enclosed base interior such that the weighted material is adapted to add weight to the bait station to restrict its movement, the poison support tray is selectively matable with the top wall to selectively cover the material access opening, wherein the material access opening comprises a collar extending within a portion of the poison support tray when the poison support tray is selectively mated with the top wall.

9. The tamper-resistant bait station of claim 8, further comprising at least one pin extending from the poison support tray and above the top wall of the base, wherein the poison is securable over the at least one pin to restrict is removal from the bait station.

* * * * *